May 17, 1932.  C. VEKONY  1,858,721

MOTOR VEHICLE

Filed Oct. 2, 1929

Patented May 17, 1932

1,858,721

UNITED STATES PATENT OFFICE

CHARLES VÉKONY, OF MISKOLCZ, HUNGARY

MOTOR VEHICLE

Application filed October 2, 1929, Serial No. 396,721, and in Germany August 22, 1929.

The present invention relates to motor vehicles and, more particularly to a device for preventing the accidents which occur so frequently in travelling by motor vehicle. As is well known these accidents are caused for the most part by the sudden braking of the motor vehicle, inasmuch as the kinetic energy of the rapidly travelling heavy vehicle cannot be destroyed in a moment without unfortunate consequential occurences. The consequence of this is that the vehicle is overturned or possibly, if travelling on a wet road, skids, or is thrown to one side.

It has already been proposed to use studded or toothed brake shoes connected pairwise to a common transverse beam. This however gives the vehicle a clumsy, unsightly appearance and in the event of one brake shoe becoming damaged it is necessary to dismantle the whole transverse beam.

According to the present invention the above mentioned drawbacks are eliminated by arranging that, skidding or overturning of the vehicle after the brakes have been applied are prevented, on the one hand by anchoring the vehicle, and, on the other hand, by providing space and time for the removal of the kinetic energy. For this purpose the vehicle is constructed similarly to a sliding box such as a match box in such manner that the inner part of the body together with the passengers in it can run out to the rear when the brakes are suddenly applied, care being, of course, taken that the said inner part after running out is supported in its end position and that the anchoring of the vehicle wheels which takes place simultaneously is rendered less violent in its operation by spring action.

The anchoring device according to the invention comprises toothed or studded brake shoes arranged independently the one in front of the other in front of each of the wheels, said brake shoes, during the braking operation, being let down, gripped by the wheels and pressed into the ground, whereby an anchoring action on the vehicle is obtained.

The device is likewise provided with two sprags pivotally suspended below the vehicle and provided at their free ends with toothed or studded shoe surfaces, said sprags being adapted to grip into the ground in a resilient manner against the action of a spring during the braking operation and thus to prevent skidding of the vehicle.

The inner part of the body preferably takes the form of an auxiliary body serving for the reception of the passengers which is arranged within the outer body and is capable of being pushed out towards the rear when the brakes are applied by the aid of a rack and pinion, driven through a bevel gear by a toothed or studded cylinder running on the ground and adapted to grip into the latter said bevel gear having a telescoping connecting shaft.

All the brake members may be actuated simultaneously from the driver's seat by means of cable and pulley control gear.

An embodiment of the invention is illustrated by way of the example on the accompanying drawings in which:—

Figure 1:
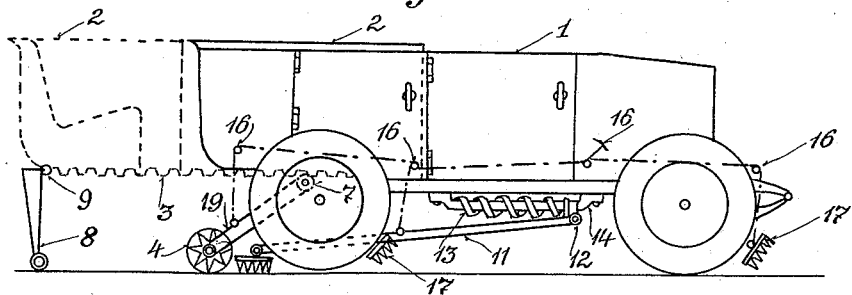
Fig. 1 is a side view of a vehicle constructed according to the invention.
Figure 2:
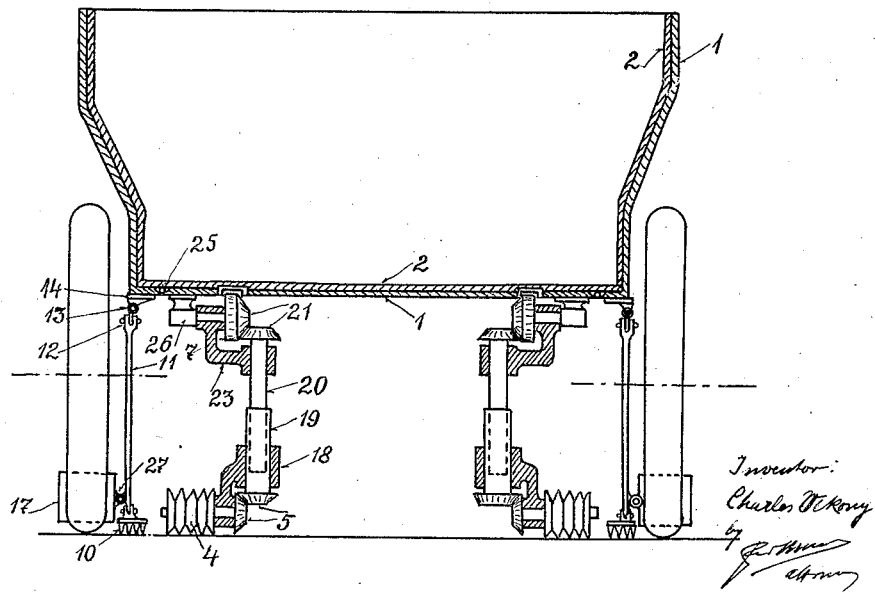
Fig. 2 is a rear view of the vehicle to a larger scale.

Referring to the drawings, the outer body 1 is provided with an auxiliary body 2 which latter is provided on its under side with a rack 3 and serves for the accommodation of the passengers. The rack 3 is in engagement with a toothed wheel 7 which is connected through the medium of bevel wheels 21, a telescoping connecting shaft 20, 19 and bevel wheels 5 with a toothed running wheel or cylinder 4. As the bevel wheels through their association with the bearings 23 and 18 respectively form a co-ordinated unit, which is capable of being swung about the upper supporting bearing 26, the whole gear can therefore be raised into the position of rest or let down into the operative position by the pedal 15 by the aid of cables passing over pulleys 16.

When the device is put into operation the gear is let down, as a consequence of which the running wheel 4 grips the ground, travels onwards together with the vehicle which is still in motion and thereby sets the rack drive in motion. As a result of this the inner body 2 is driven out backwards on the ball bearings 25 and comes into the extreme position as indicated by dotted lines in Fig. 1, in which position it is supported by a supporting member 8 which is brought into the operative position by spring action and is preferably rotatable about a hinge 9.

An effective braking action and the prevention of the possibility of the vehicle turning over are obtained by means of the toothed or studded brake shoes 17 for all four wheels, which can likewise be let down from the driver's seat and, being engaged by the wheels, are pressed down into the ground, whereby skidding of the vehicle is prevented. A further braking effect or anchoring action is obtained by means of two sprags 11, which are likewise actuated from the driver's seat and are provided at their free ends with toothed shoes 10, the teeth of which grip into the ground by the weight of the sprags 11 and thus anchor the vehicle. In order to lesson the shock of this powerful braking action, the sprags are pivotally suspended from a horizontal supporting member and are arranged so as to be slidable against the action of powerful springs 13.

The brake shoes 17 in front of the rear wheels are arranged very near the wheels and yieldingly connected with the sprags 11 at 27 in such a manner that the centre of gravity of the brake shoes lies slightly above the front of suspension 27, so that on the pedal 15 being released from the driver's seat the brake shoes tip over and are gripped by the wheels, the yielding suspension 27 disengages, and the brake shoes are held only by the wire cables guided over the pulleys 16. After the emergency braking, the brake shoes must be again pulled up. The construction of the yielding suspension 27 is only shown diagrammatically and may be of any other type. The front brake shoes are also suspended on wire cables and simply lowered when the emergency braking takes place.

With regard to the rearward movement of the slidable body it may be mentioned that this arrangement is not intended to absorb the entire live force of the vehicle in the case of sudden braking, but only to reduce the force which tends to throw out the passengers in the vehicle. This is attained in that the inner body has already terminated its rearward movement during the first two or three meters of the travel of the vehicle with the brakes applied, when the braking is not entirely completed, as the spiked running wheels 4 effect the drive of the inner body right from the beginning.

I claim:—

A safety arrangement on motor driven vehicles for preventing accidents due to the sudden braking, comprising in combination with the chassis, a rearwardly shiftable body portion of the vehicle on said chassis, two brake drums oscillatably mounted under said chassis adapted to roll over the ground and to conform with the irregularities in the surface of the road, two telescopic two-part shafts, and toothed gearing connecting each of said drums with said shiftable body portion so that at the commencement of the braking the centre of gravity of the vehicle is shifted towards the rear.

In testimony whereof I affix my signature.

CHARLES VÉKONY.